United States Patent
Hecht et al.

(10) Patent No.: US 9,580,084 B2
(45) Date of Patent: Feb. 28, 2017

(54) TRANSPORT CONTAINER, VEHICLE, TRACTION GROUP, METHOD FOR LOADING A TRANSPORT CONTAINER, AND METHOD FOR TRANSPORTING BULK MATERIAL

(71) Applicants: TECHNISCHE UNIVERSITAET BERLIN, Berlin (DE); HAVELLAENDISCHE EISENBAHN AG, Berlin (DE)

(72) Inventors: Markus Hecht, Berlin (DE); Christian Maengel, Michendorf (DE); Harald Jakatt, Berlin (DE); Christian Nayeri, Berlin (DE); Ramy Shoeib, Berlin (DE); Guenther Alsdorf, Brandenburg Havel (DE); Uwe Wullstein, Strausberg (DE)

(73) Assignees: TECHNISCHE UNIVERSITAET BERLIN, Berlin (DE); HAVELLAENDISCHE EISENBAHN AG, Berlin (DE)

( * ) Notice: Subject to any disclaimer, the term of this patent is extended or adjusted under 35 U.S.C. 154(b) by 71 days.

(21) Appl. No.: 14/388,997

(22) PCT Filed: Mar. 26, 2013

(86) PCT No.: PCT/EP2013/056353
§ 371 (c)(1),
(2) Date: Sep. 29, 2014

(87) PCT Pub. No.: WO2013/144116
PCT Pub. Date: Oct. 3, 2013

(65) Prior Publication Data
US 2015/0086324 A1 Mar. 26, 2015

(30) Foreign Application Priority Data
Mar. 29, 2012 (DE) .......................... 10 2012 205 139

(51) Int. Cl.
*B65G 67/00* (2006.01)
*B61D 17/02* (2006.01)
(Continued)

(52) U.S. Cl.
CPC .............. *B61D 17/02* (2013.01); *B61C 13/00* (2013.01); *B61D 7/00* (2013.01); *B61D 7/14* (2013.01);
(Continued)

(58) Field of Classification Search
CPC ........ B61C 13/00; B61D 17/02; B61D 39/00; B61D 7/00; B61D 7/14; B61D 7/32; B65D 88/123; Y02T 30/32
See application file for complete search history.

(56) References Cited

U.S. PATENT DOCUMENTS

| 1,036,849 | A | * | 8/1912 | Huettel | .................. | B61D 39/00 |
| | | | | | | 105/377.04 |
| 2,167,364 | A | * | 7/1939 | Johnson | .................. | B61D 7/30 |
| | | | | | | 105/247 |

(Continued)

FOREIGN PATENT DOCUMENTS

| CN | 2587742 | 11/2003 |
| CN | 200964112 | 10/2007 |

(Continued)

OTHER PUBLICATIONS

Machine translation of WO2008028307 from Espacenet, accessed on Jun. 17, 2016.*

(Continued)

*Primary Examiner* — Michael McCullough
*Assistant Examiner* — Mark Hageman
(74) *Attorney, Agent, or Firm* — Brooks Kushman P.C.

(57) ABSTRACT

A transport container, in particular as a component part of a rail vehicle, having a transportation space for receiving (Continued)

goods to be transported, which on its upper side includes at least one opening, wherein the transport container includes a grate which at least in part covers the opening.

13 Claims, 2 Drawing Sheets

(51) Int. Cl.
| | | |
|---|---|---|
| *B61D 7/00* | (2006.01) | |
| *B61D 39/00* | (2006.01) | |
| *B65D 88/12* | (2006.01) | |
| *B65D 90/00* | (2006.01) | |
| *B61C 13/00* | (2006.01) | |
| *B61D 7/14* | (2006.01) | |
| *B65G 67/04* | (2006.01) | |
| *B65G 67/24* | (2006.01) | |

(52) U.S. Cl.
CPC ........... *B61D 39/00* (2013.01); *B65D 88/123* (2013.01); *B65D 90/00* (2013.01); *B65G 67/04* (2013.01); *B65G 67/24* (2013.01); *Y02T 30/32* (2013.01)

(56) References Cited

U.S. PATENT DOCUMENTS

| | | | |
|---|---|---|---|
| 2,186,700 A | | 1/1940 | Johnson |
| 4,068,769 A | * | 1/1978 | Sweet ....................... B65F 3/24 116/28 R |
| 4,909,154 A | | 3/1990 | Walker et al. |
| 5,054,402 A | * | 10/1991 | Brassell ................. B61D 39/00 105/377.01 |
| 5,181,474 A | * | 1/1993 | Miller .................... B61D 17/04 105/355 |
| 5,546,865 A | | 8/1996 | Haentjens et al. |
| 5,893,399 A | | 4/1999 | Kearney |
| 7,370,818 B2 | | 5/2008 | Ward et al. |
| 7,810,867 B2 | | 10/2010 | Salaverry |
| 2009/0278381 A1 | | 11/2009 | Iden et al. |

FOREIGN PATENT DOCUMENTS

| | | |
|---|---|---|
| DE | 29510635 | 9/1995 |
| DE | 69511603 | 3/2000 |
| DE | 20320857 | 3/2005 |
| DE | 102006044609 | 3/2008 |
| DE | 202009011413 | 11/2009 |
| GB | 396848 | 8/1933 |
| RU | 2031068 | 3/1995 |
| WO | 2008028307 | 3/2008 |

OTHER PUBLICATIONS

International Search Report for PCT/EP2013/056353, English translation attached to original, Both completed by the European Patent Office on Jun. 24, 2013, All together 5 Pages.

* cited by examiner

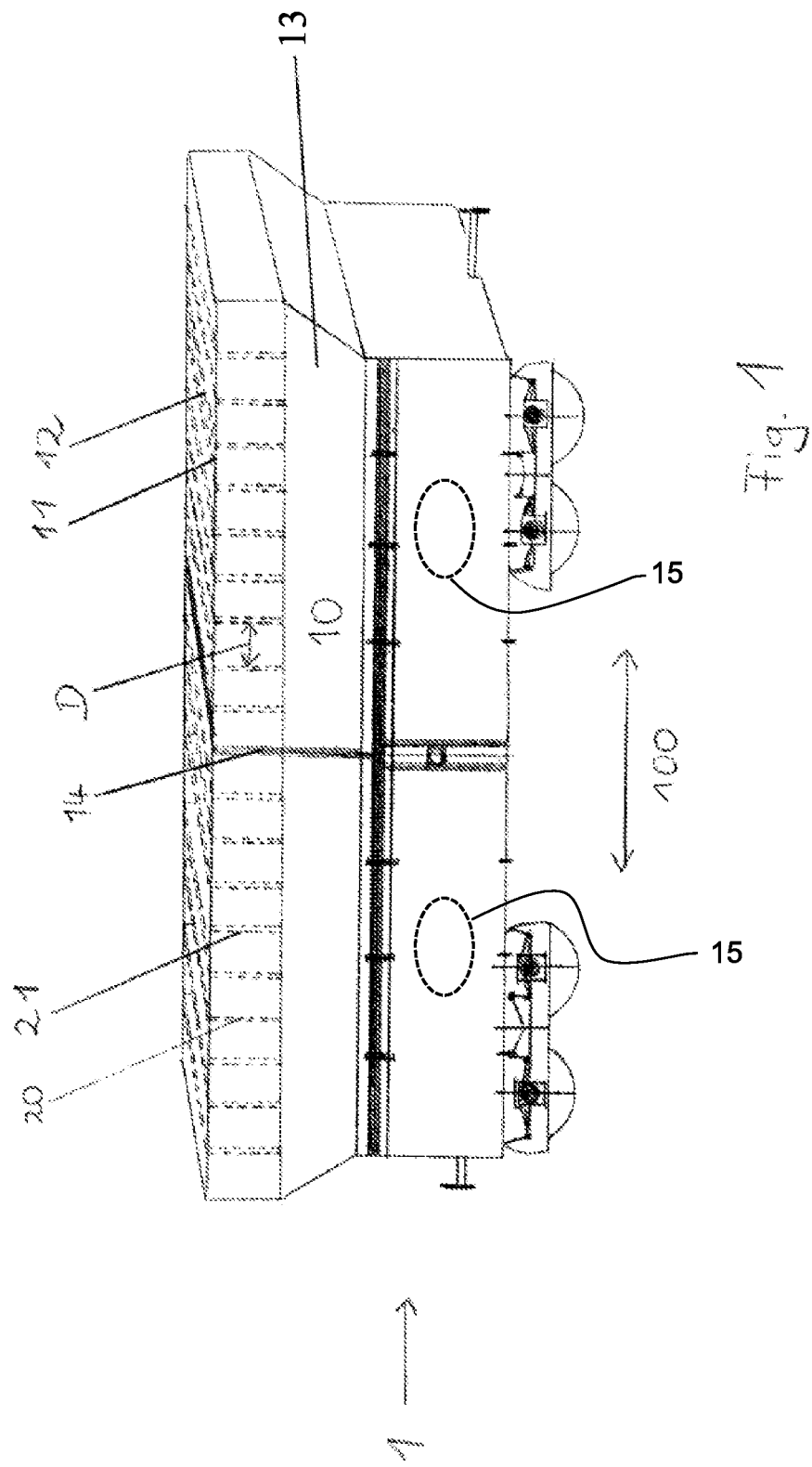

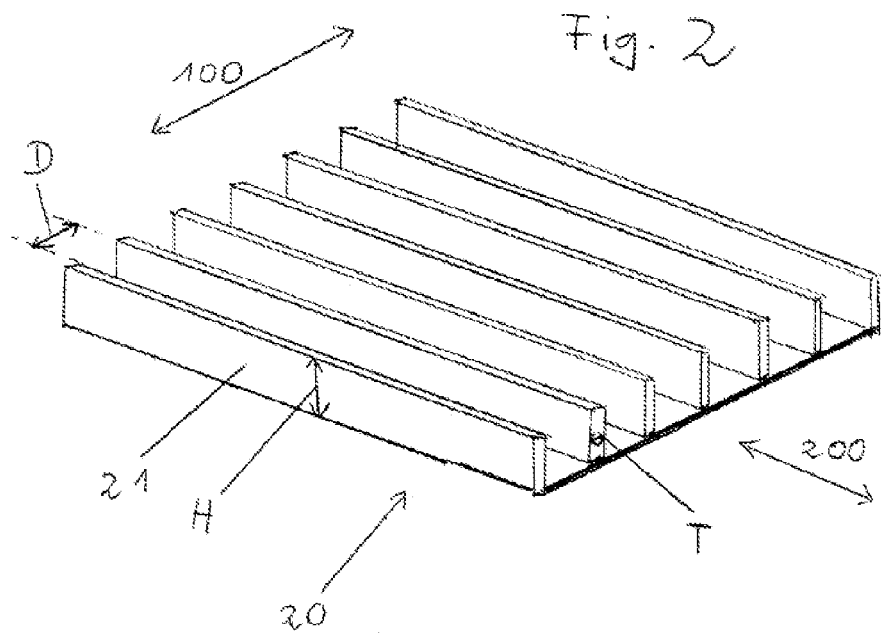
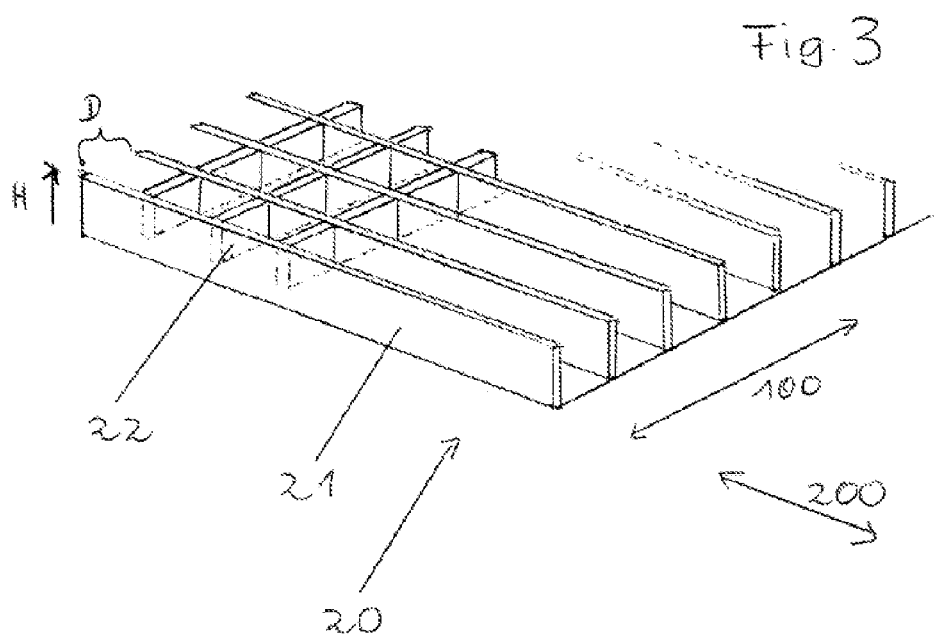

TRANSPORT CONTAINER, VEHICLE, TRACTION GROUP, METHOD FOR LOADING A TRANSPORT CONTAINER, AND METHOD FOR TRANSPORTING BULK MATERIAL

CROSS-REFERENCE TO RELATED APPLICATION

This application is the U.S. national phase of PCT Application No. PCT/EP2013/056353 filed on Mar. 26, 2013, which claims priority to German Patent Application No. 102012205139.2 filed on Mar. 29, 2012, the disclosures of which are incorporated in their entirety by reference herein.

The present invention relates to a transport container, a vehicle, in particular a rail vehicle, and a traction group which includes at least one of the vehicles according to the invention. The invention furthermore relates to a method for loading the transport container, and a method for transporting bulk material by means of the vehicle according to the invention.

In passenger trains, aerodynamic vehicles are increasingly employed on account of the requirements of energy efficiency and environmental sustainability. In contrast, hardly any optimizing has hitherto taken place in rail goods transport with respect to energy losses caused by aerodynamics, since on account of the lower speed also smaller energy losses have to be incurred. On account of the looming diminishment of raw material reserves, and the accompanying rises in energy costs, and the demand for better environmental sustainability, aerodynamic designs are playing an increasingly important role also in goods transport.

It has been established that in particular cars which are open on the upper side, such as bulk material cars, for example, already also at relatively slow speeds cause air flows in which the force vectors counteract at least in a proportional manner the respective forces which accelerate the vehicle. This is in particular a result of air turbulences on the side walls delimiting in the direction of travel.

Bulk material cars are often designed in such a manner that they can be emptied in a laterally downward manner by means of gravity. They alternatively dispose tilting devices for the loading bay. In this case, unloading takes place laterally, using the tilting device.

More air turbulence in the opening region of the bulk material cars may be created when the latter are in the empty state and thus have a higher drag than in the loaded state, or when the surface of the loaded bulk material is located farther below the opening of the car. While the flow rates and the energy losses connected therewith in the case of goods trains are relatively small on account of the speeds which, in comparison with passenger trains, are slow, they do have an exponential effect in respect of the drag which has to be overcome. For logistical reasons, relatively many trips of goods train cars have to be undertaken when empty or only partially filled. Said goods train cars consequently cause considerable energy consumption which is due to drag and which, on the one hand, increases the operational costs and, on the other hand, causes an increased environmental impact.

Conventional solutions to this problem are closed covers of the cars, or tarpaulins. However, these have the disadvantage that the bulk material can only be filled in a relatively complex manner, since the cover and/or the tarpaulin has to be removed first and has to be reattached after loading. Moreover, the closing system results in an increased maintenance effort.

DE 295 10 635 U1 discloses a bulk material container having roof covers which are capable of being opened, wherein the roof covers consist of roof panels. An alternative thereto is offered by a device for sealing the loading spaces of bulk material transporters by means of an easily replaceable spring-loaded sealing rail which is populated with rubber ribs and which is narrated in DE 10 2006 044 609 A1. U.S. Pat. No. 4,909,154 discloses a device in the form of a fairing and/or a shrouding, which is attachable on a hopper car in order to reduce the drag of the latter.

Moreover, it has been found that short spacings between individual cars and shorter cars have a favorable effect in respect of drag. Moreover, DE 695 11 603 T2 proposes to affix fins which are intended to reduce drag between individual cars.

DE 203 20 857 U1 describes a foldable open container. The advantage of this container lies in that it is more aerodynamic in the empty and folded state than in the unfolded state. However, in a significant manner, a higher cost and additional effort for utilizing the container is created here.

The present invention is based on the object of providing a transport container, in particular a transport container for a rail vehicle, a vehicle including this transport container, and a traction group comprising this vehicle, wherein the transport container, despite a permanent opening on its upper side and substantially irrespective of its loading state, includes an aerodynamically advantageous embodiment.

This object is achieved by the transport container according to the invention as claimed in claim 1, and by the vehicle as claimed in claim 10.

Advantageous embodiments of the transport container are stated in the dependent claims 2 to 9. An advantageous embodiment of the vehicle is stated in claim 11.

Moreover, a traction group according to claim 12, which includes at least one of the vehicles according to the invention, is provided.

The invention furthermore relates to a method for loading a transport container according to the invention, and to a method for transporting bulk material by means of a vehicle according to the invention, according to claims 13 and 14.

The transport container according to the invention is in particular designed for application in a rail vehicle.

In a preferred embodiment, the transport container is a component part of a bulk material car. However, the application of the invention in flat cars and/or carrier cars having bulkheads should also not be excluded here.

Furthermore, the application of the transport container in road, maritime or air transport should not be excluded.

The transport container comprises a transportation space for receiving goods to be transported, which, on its upper side includes at least one opening, wherein the transport container includes a grate which at least in part covers the opening. The advantage of the invention lies in particular in increasing aerodynamic efficiency when transporting the transport container at relatively high speed, while at the same time ensuring top-loading by pouring, without having to remove the grate here. Of course, the grate here should be implemented in such a manner that it has sufficient strength, even under loading by pouring of the goods to be transported. A further advantage of the transport container according to the invention consists in the enlargement of its cross section and the axial and the polar section moduli, and consequently also of the permissible tensile, compressive, flexural and torsional stresses in the transport container, such that the latter is exposable to higher forces and/or can absorb higher loads, wherein other parts, in particular structural parts of the transport container can be changed in their geometry in such a manner that the transport container has a lower weight and, consequently, a higher load capacity. The grate disposed according to the invention moreover offers fine-grained bulk material protection against dispersal by the airflow, such that the grate disposed according to the invention also has advantages in the case of lower transportation speeds, such as in maritime transport.

This means that the transport container may be used in rail transport or road transport as a unit which is received by a car, or as a component part of a car, such as, for example, of a bulk material car.

As a unit which is separable from a car, the transport container may for example be embodied as a shipping container which may employ its advantageous effect also in maritime transport. It should not be excluded here that a ship is provided with a cargo hold which is embodied according to the transport container according to the invention.

The transport container according to the invention is preferably embodied in such a manner that it includes side walls which laterally delimit the transportation space and between which the grate is disposed. The transport container thus includes a container which is open on its upper side, as is provided, for example, in the bulk material car. The grate bridges the side walls. The side walls extend substantially in the direction of longitudinal extent and thus delimit the transportation space and/or the container in a manner perpendicular to the direction of longitudinal extent.

In particular in the case of transport containers which are applied in rail and/or road transport, the longitudinal dimension in the direction of longitudinal extent is greater than the longitudinal dimension in the direction of transverse extent.

In this case, the intended direction of travel corresponds to the direction of longitudinal extent of the transport container.

In the case of transport containers in which the longitudinal dimensions in the direction of longitudinal extent and in the direction of transverse extent are equal, the intended direction of travel corresponds to the direction of longitudinal extent or to the direction of transverse extent of the transport container. It is provided in one variant of embodiment that the grate includes only transverse stays which extend substantially transversely to the direction of longitudinal extent. The grate thus comprises transverse stays which extend between two walls which extend substantially in the direction of longitudinal extent of the transport container. The transverse stays are consequently configured in the manner of a gridiron. The transverse stays preferably extend exactly perpendicularly to the direction of longitudinal extent of the transport container.

It is provided in another variant of embodiment that the grate includes transverse stays which extend substantially transversely to the direction of longitudinal extent, and includes longitudinal stays which extend substantially in the direction of longitudinal extent. The grate thus comprises mutually intersecting grate stays, wherein the transverse stays preferably extend exactly perpendicularly to the direction of longitudinal extent of the transport container, and the longitudinal stays extend exactly in the direction of longitudinal extent of the transport container. The advantage of this embodiment lies in the higher axial section modulus caused by the longitudinal stays and the larger cross section of the transport container transverse to the direction of longitudinal extent, such that tensile forces and, in particular, the compressive forces which—when the transport container is used as a component part of a rail vehicle—cause the major strain, can be better absorbed in the direction of longitudinal extent and/or lower stresses are induced in the transport container. Consequently, the entire construction of the transport container and consequently also of the vehicle may be implemented so as to be lighter than in conventional transport containers and/or vehicles of the same type, such that less energy deployment for moving the transport container and/or vehicle is required and/or a load having a higher weight may be received by the transport container and/or vehicle.

This means that the grate has mutually intersecting stays which are disposed at regular spacings, wherein the grate stays of a first orientation are disposed so as to be substantially parallel to one another and the grate stays of a second orientation are disposed so as to be substantially parallel to one another. The orientations of the grate stays here are preferably perpendicular or parallel to the side walls of the transport container, wherein the present invention is not limited to such angular conditions. Moreover, the present invention is not limited to the arrangement of grate stays having only two orientations, but there may also optionally be grate stays of further orientations. These orientations may deviate from 90° (in relation to one of the side walls) or deviate therefrom by an integral multiple.

It is provided in a further alternative embodiment that the grate is a plate which is provided with a multiplicity of holes. In an implementation made of metal, this grate is consequently a perforated panel, wherein the stays are formed by the material regions which surround the holes.

It is advantageously provided that the grate is connected in a mechanically fixed manner to at least one side wall. The meaning of this mechanically fixed connection in the sense of the invention also includes a pivotable arrangement of the grate on the side wall. The grate is preferably fixedly connected to at least two walls which run in the direction of longitudinal extent, in particular when the grate consists of only transverse stays. In the embodiment in which the grate includes both transverse and longitudinal stays, it may also be provided that the grate is fixedly connected to two walls which run in the direction of longitudinal extent and is fixedly connected to two walls which run perpendicularly to the direction of longitudinal extent. In the case of a pivotable arrangement on one side wall, a mechanically releasable fixation of the grate on the opposite side wall should take place. The side walls are preferably closed walls.

With respect to the fastening of the grate it may alternatively also be provided that the grate bears on at least two side walls and/or is connected in a form-fitting manner to at least two side walls. A bearing on a side wall may be implemented in such a manner that the grate bears on an extra bearing unit which is fastened to one side wall, such that the weight force of the grate is proportionally transmitted via the respective bearing unit onto the side wall.

The spacing D of the transverse stays between one another should have a ratio $0.8 \leq D/H \leq 1.2$ to the height H of the stays. Preferably $D/H=1$, that is to say that the spacing of the transverse stays between one another corresponds substantially to the height of the transverse stays. It has emerged that a ratio of this type causes particularly low drag and, consequently, good aerodynamics. On account thereof, an adequate bearing strength is moreover ensured. The height H here is the dimension of the extent of the stays in the vertical direction. The spacing D is measured in the direction of longitudinal extent and is 0.75 m maximum. In general, the spacings D between the transverse stays should be a multiple of the diameter of the respective goods to be transported for which the transport container has been conceived. The thickness T of the stays should correspond to at least D/5.

The transportation space of the transport container may moreover be divided into chambers by at least one intermediate wall, wherein the intermediate wall should have a spacing of at least 5 m to a side wall delimiting in the direction of longitudinal extent. The intermediate wall here may itself configure a transverse stay. This intermediate wall has the effect of a higher bearing strength of the transport container, and moreover may act as a support for the grate.

The transport container may furthermore be embodied in such a manner that it comprises an emptying unit, by way of which unloading of the goods to be transported is implementable through an opening other than the opening provided with the grate. On account thereof, simple downward emptying in the manner of a bulk material car is possible, without interference from the grate stays.

The invention also relates to the use of a transport container according to the invention for receiving and transporting bulk material.

A further aspect of the invention is a vehicle which comprises at least one transport container according to the invention. This vehicle is in particular a bulk material car.

In the case of such a bulk material car there is no interference during unloading, since bulk material cars are unloaded in a downward manner.

The transport container here does not necessarily have to be an integral component part of the vehicle, but the transport container, as a component part of the vehicle, such as a shipping container, for example, may also be releasably connected to the remaining component parts of the vehicle.

Moreover, according to the invention a traction group which comprises a tractor and at least one of the vehicles according to the invention is provided. A plurality of the vehicles, in particular a plurality of bulk material cars, which are equipped with the grate according to the invention are preferably disposed in the traction group. Such a traction group, on its upper side, has smaller air turbulences, the force components of which counteract the traction force.

Furthermore provided is a method for loading a transport container according to the invention and, consequently, also a vehicle according to the invention with bulk material, in which the bulk material is poured into the transportation space via the grate openings. On account of the grate leaving openings through which the bulk material can fall into the transportation space, there is no substantial interference when loading the transport container. Unloading preferably takes place after removal of the grate, or by way of an integrated unloading unit, or by way of tipping out via the grate.

Complementing the invention, a method for transporting bulk material, in which at least one vehicle according to the invention and/or a traction group according to the invention is used for transporting the bulk material, is moreover provided. By using the vehicle according to the invention, the bulk material can be transported in a more energy efficient and thus also more environmentally friendly manner.

The invention is explained in more detail in the following by means of the exemplary embodiments illustrated in the appended drawings.

In the drawings:

FIG. 1 shows a bulk material car in a side view,

FIG. 2 shows a first variant of a grate, in a perspective view, and

FIG. 3 shows a second variant of a grate, in a perspective view.

For explaining the invention, reference is made to a bulk material car 1 which is illustrated in FIG. 1 and which comprises a transport container according to the invention. The present invention here is not limited to a bulk material car of this type, but it also relates to a separate transport container which is to be received on or in a vehicle, such as in a rail car, for example.

In the illustrated bulk material car 1 which comprises a transport container according to the invention, the direction of longitudinal extent corresponds to the intended direction of travel 100.

In FIG. 1, a bulk material car 1, which includes a transportation space 10 for receiving bulk material and which, in turn, is delimited by side walls 13, is illustrated. On its upper side 11, the bulk material car includes an opening 12. The transportation space 10 can be loaded with bulk material via this opening 12. Unloading takes place via emptying units 15 which is disposed in the lower region of the bulk material car 1. Alternatively, the bulk material car 1 includes a tilting device, by way of which the entire transportation space 10 can be laterally tilted.

According to the invention, the bulk material car, on its upper side 11, includes at least one grate 20 which is indicated in FIG. 1 by the dashed lines and has a multiplicity of transverse stays 21. These transverse stays 21 are disposed at specific spacings D from one another.

For subdividing the transportation space 10, the bulk material car 1 moreover includes an intermediate wall which structurally supports the grate 20 and/or configures a transverse stay 21.

Two different grate alternatives according to the invention are illustrated in FIGS. 2 and 3. The grate shown in FIG. 2 includes only transverse stays 21 which are disposed at specific spacings D from one another. It is evident that the transverse stays 21 extend in the direction of transverse extent 200 and thus substantially perpendicularly to the direction of travel and/or the direction of longitudinal extent 100. The ends of the transverse stays 21 are to be mechanically connected to the side walls 13 of the bulk material car 1.

In FIG. 3, a grate variant in which the grate 20 includes both transverse stays 21 and also longitudinal stays 22 is illustrated. It can be seen that the transverse stays 21 and longitudinal stays 22, on their upper side, preferably have the same height level, that is to say that they terminate so as to be flush with one another. However, the longitudinal stays 22 need not have the same height H as the transverse stays 21 for reasons of strength and aerodynamics, but the longitudinal stays may be equipped with a smaller height dimension, in particular in the case of terminating so as to be flush with the transverse stays. The thickness T of the transverse stays 21 and, optionally, also of the longitudinal stays 22 should correspond at least to the spacing D between the stays.

The grate according to the invention should preferably extend across the entire opening 12 of the car. In an alternative embodiment, the grate 20 may also cover the opening 12 only in part, wherein the grate, in the direction of travel 100, should preferably be disposed in the forward region of the bulk material car 1.

Moreover, the spacings D between the stays need not always be identical, wherein, in the direction of travel 100, in particular in the rear region of the vehicle, the stays may have larger spacings than in the forward region of the vehicle.

On account of the arrangement according to the invention of a grate 20, air turbulences on the delimiting side walls, in the direction of travel 100, are prevented or at least substantially reduced, such that the drag of the vehicle is reduced and, consequently, less energy has to be deployed to move the vehicle. Furthermore, the vehicle is stiffened by the grate 20, such that said vehicle has a higher bearing strength. On account thereof, a higher payload can be received and/or the vehicle itself may be implemented with a lower material investment and, consequently, with less weight, such that lower forces are required for accelerating the vehicle.

LIST OF REFERENCE SIGNS

Bulk material car 1
Transportation space 10
Upper side 11
Opening 12
Side wall 13
Intermediate wall 14
Grate 20
Transverse stay 21
Longitudinal stay 22
Spacing D
Height H
Thickness T
Direction of travel,
Direction of longitudinal extent 100
Direction of transverse extent 200

The invention claimed is:

1. A transport container, the transport container comprising: a bulk material car body having a longitudinally extending transportation space for receiving goods to be transported, which on its upper side includes at least one opening, wherein the transport container includes a grate which at least in part covers the at least one opening, and the grate includes a plurality of transverse stays which extend substantially transversely to the direction of longitudinal extent, wherein the spacing D of the transverse stays between one another is $0.8 \leq D/H \leq 1.2$, where H is the height of the transverse stays.

2. The transport container as claimed in claim 1, wherein said transport container includes side walls which laterally delimit the transportation space and between which the grate is disposed.

3. The transport container as claimed in claim 2, wherein the grate is connected in a mechanically fixed manner to at least one side wall.

4. The transport container as claimed in claim 2, wherein the grate bears on at least two side walls and/or is connected in a form-fitting manner to two side walls.

5. The transport container as claimed in claim 1, wherein the grate includes only the transverse stays.

6. The transport container as claimed in claim 1, wherein the grate includes transverse stays which extend substantially transversely to the direction of longitudinal extent, and includes longitudinal stays which extend substantially in the direction of longitudinal extent.

7. The transport container as claimed in claim 1, wherein $D \leq 0.75$ m.

8. The transport container as claimed in claim 1, wherein said transport container comprises an emptying unit, by way of which unloading of the goods to be transported is implementable through an opening other than the opening provided with the grate.

9. A vehicle comprising a transport container as claimed in claim 1.

10. The vehicle as claimed in claim 9, wherein said vehicle is a bulk material car.

11. The transport container as claimed in claim 1, wherein the transport container is a component part of a rail vehicle.

12. A method for loading a transport container, comprising:
providing a transport container having a bulk material car body having a longitudinally extending transportation space for receiving goods to be transported, which on its upper side includes at least one opening, wherein the transport container includes a grate which at least in part covers the opening, and the grate includes transverse stays which extend substantially transversely to the direction of longitudinal extent, with grate openings there between, wherein the spacing D of the transverse stays between one another has the following ratio to the height H of the stays: $0.8 \leq D/H \leq 1.2$; and
pouring bulk material, into the transportation space via the grate openings.

13. A method for transporting bulk material, comprising:
providing a transport container having a bulk material car body having a longitudinally extending transportation space for receiving goods to be transported, which on its upper side includes at least one opening, wherein the transport container includes a grate which at least in part covers the opening, and the grate includes transverse stays which extend substantially transversely to the direction of longitudinal extent, with grate openings there between, wherein the spacing D of the transverse stays between one another has the following ratio to the height H of the stays: $0.8 \leq D/H \leq 1.2$;
providing an emptying unit, by way of which unloading of the goods to be transported is implementable through an opening other than the opening provided with the grate;
pouring bulk material, into the transportation space via the grate openings; and
unloading of the bulk material through the emptying unit.

* * * * *